United States Patent [19]

Boughton

[11] Patent Number: 4,647,916

[45] Date of Patent: Mar. 3, 1987

[54] DATA DISPLAY CONTROL

[75] Inventor: Geoffrey J. Boughton, Sandy, England

[73] Assignee: International Computers Limited, London, England

[21] Appl. No.: 572,061

[22] Filed: Jan. 19, 1984

[30] Foreign Application Priority Data

Jan. 26, 1983 [GB] United Kingdom ............... 8302094

[51] Int. Cl.$^4$ .............................................. G09G 1/06
[52] U.S. Cl. .................................... 340/724; 340/792
[58] Field of Search ............... 340/726, 724, 709, 710, 340/712; 178/18, 19; 340/365 R, 711, 792

[56] References Cited

U.S. PATENT DOCUMENTS

| | | | |
|---|---|---|---|
| 3,611,348 | 10/1971 | Rogers | 340/726 |
| 3,891,792 | 6/1975 | Kimura | 340/726 X |
| 4,091,234 | 5/1978 | Bristow | 340/365 R X |
| 4,148,014 | 4/1979 | Burson | 340/724 X |
| 4,160,981 | 7/1979 | Raney, Jr. | 340/726 X |
| 4,284,988 | 8/1981 | Seitz et al. | 340/726 |
| 4,302,011 | 11/1981 | Pepper, Jr. | 178/19 X |
| 4,358,761 | 11/1982 | Iwasaki | 340/726 X |
| 4,369,440 | 1/1983 | Piguet et al. | 340/711 |
| 4,439,838 | 3/1984 | Klingerberg | 340/709 X |
| 4,493,992 | 1/1985 | Geller | 340/709 X |
| 4,566,001 | 1/1986 | Moore et al. | 340/709 X |

Primary Examiner—Marshall M. Curtis
Assistant Examiner—Vincent P. Kovalick
Attorney, Agent, or Firm—Lee, Smith & Zickert

[57] ABSTRACT

A data display control arrangement in which apparatus for scrolling lines of data relative to a display area of a data display apparatus (1) comprises means (2) for producing a selectively controllable scrolling action, the means (2) including a transducer device (16) comprising two groups (18A, 18B) respectively including two sets (20,21) (24,25) of elctrical contact tracks 19 and an elastomeric pad which includes a non conductive member 27 is loaded with conductive material, whereby pressure on the member (27) changes the conductivity thereof and in so doing progressively interconnects the tracks of the sets (20,21) (24,25) to produce analogue signals related to extent of pressure. A converter 9 converts the analogue signals to digital signals which are used to control said scrolling.

4 Claims, 3 Drawing Figures

DATA DISPLAY CONTROL

This invention relates to data display control arrangements and methods of use thereof In particular this invention is concerned with a control arrangement for control of the display of data contained in a store, i.e. RAM, by a display means having an instantaneous display capability, which is less than the amount of data required to be displayed.

It is known to deal with this problem by means of a technique called scrolling whereby electrical switch arrangements are provided for effectively controlling the relative movement of available display area with respect to the total amount of data to be displayed, or by moving the data relative to the available area. In practice, the material to be displayed is stepwise displayed with respect to the display area. The effect of this operation is that the material displayed appears to move across the display region in steps of varying size. It has been found that when displaying or scanning data which is presented upon a screen in a randomly disposed manner it is desirable that the steps of the stepwise scanning or scrolling should be as small as possible and at a rate at which an operator or reader is able to assimilate the data being displayed A convenient, or satisfactory rate of scrolling is, for any operator or reader, a subjective matter and is governed by a number of factors which are in part related to the nature of the data to be presented, and the subjective response of the operator or reader to the reading operation.

Amongst the relevant factors there are:
(a) Reading rate of the operator or reader;
(b) Reading capability of the operator or reader;
(c) The speed at which the display responds to an operator or reader demand;
(d) The nature of the data to be read;
(e) The amount of data to be read.

It has been found that the last factor has an important bearing upon the ease and facility by which the operator or reader is able to accommodate the reading of the data. If the amount of data is marginally or not very greatly larger than the display area, the reader usually is able effectively to ignore any inconveniences arising from scrolling rate, or the like. If the amount of data is very much greater than the display area—it has been found important that the operator or reader should be able readily According to a first aspect of the invention there is provided a method of scrolling lines of data with respect to a display area of a data display unit, comprising the steps of producing first and second digital signals respectivel characteristic of displacement of the display in a first sense, and in a second sense opposite to the first sense; producing first and second further digital signals respectively characteristic of the rate of displacement of the display in said first and second senses and establishing a selectively settable reference digital signal which determines a reference signal level for the first and second signals.

In accordance with a second aspect of the invention there is provided apparatus for scrolling lines of data relative to a display area of a data display apparatus, comprising means for producing a selectively controllable scrolling action including a transducer device for converting manual pressure into an electrical analogue output characteristic of an applied pressure; means for converting the analogue output into a series of digital signals of which at least one is arranged to be indicative of a particular direction of scrolling and such that two or more of the other digital signals are arranged to be indicative of the rate of scrolling in a said particular direction.

Conveniently the transducer device includes at least two conductive strips which are selectively electrically connectable by a conductive path comprising an elastomeric material having a conductivity/resistivity value per unit length which is variable according to the extent of distortion or compression of the material from, a rest or ambient condition.

For a better understanding of the invention reference will now be made to the accompanying drawings in which.

Figure 1:
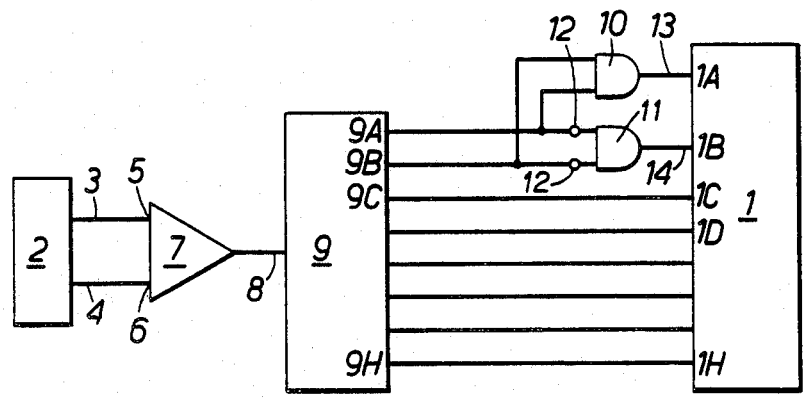
FIG. 1 is a schematic circuit diagram of a system incorporating the features of the invention.

Referring now to FIG. 1 which is a schematic diagram of a system incorporating the features of the invention display unit is schematically shown at 1. The unit may be any conventional display unit responsive to digital input signals and having control circuits which allow relative up and down displacement between a window, cursor or the like, and a data display, or which enables a block of data to be displaced, up and down, relative to a display area which is to define a viewing or reading area of the display, and which control circuits are capable of being responsive to a change rate of relative displacement. Thus the display may be considered to have an 'Up' input 1A, a 'Down' input 1B, and a series of rate variation inputs (1C-1H) whereby rate of relative displacement may be controlled in both the 'Up' and 'Down' directions. The requisite inputs for the control of the relative display movements, are according to the features of the invention, derived from a manual control unit 2 which includes a pressure responsive operator controllable transducer assembly which enables the production on a first output 3 of a first analogue signal representative of the 'Up' display direction, and displacement rate control in this direction, and the production on a second output 4 of a second analogue signal representative of a demand for the 'Down' display direction and displacement rate control in this direction.

The output 3 or 4 of the assembly 2 connect with inputs 5,6 of a differential device such as a differential amplifier 7, whose output 8 is connected to the analogue input of an analogue to digital convertor unit 9.

This convertor unit 9 is conveniently formed by any analogue to digital convertor which is preferably comprised by an integrated circuit arrangement providing a multibit output. Such a converter can be a microprocessor. The unit 9 provides from the analogue input applied thereto a series of eight digital output signals, at output terminals identified as 9A, 9B, 9C-9H in the FIG. 1. Of these digital output signals those appearing at the output terminals 9A, 9B are associated with the control of the directions of scrolling i.e. Up and Down, and will in fact be represented by the uppermost digital values.

The remaining digital output signals applied to the output terminals 9C through 9H are associated with the variable rate of drive for the scrolling, with each such output terminal having applied thereto a predetermined digital signal value.

The output terminal 9A and 9B are connected to a pair of AND gates 10 and 11 (the AND gate 11 having invertors 12 at its two inputs) whose outputs 13, 14 respectively relate to the conditions: scrolling 'Up' and scrolling 'Down'. The inter-relationship of the inputs to and outputs from the AND gates 10 and 11 can be conveniently defined by the relationships: scrolling 'Up' satisfies the condition 9A∧9B, and the scrolling 'Down' satisfies the condition $\overline{9A}$∧$\overline{9B}$.

In other words, the unit 9 is such that it is able to produce on its several digital output terminals, output signals in the digital value range 0–250. For example, 1,2,4,8,16,32,64,128.

The two most significant bits 64 and 128 are respectively utilised in the establishment of a threshold level for an operational output and the direction of scrolling i.e. 'Up' or 'Down'.

Thus the bit level 128 is used to define a threshold level, and the next most significant bit 64 is used to control the direction of scrolling (i.e, 64 bits is indicative of an UPward scroll and NOT 64 as indicative of a DOWNward scroll. That is to say 128+64 establishes Upward scrolling and 128+$\overline{64}$ establishes Downward scrolling.

The remaining bits 1,2,8,16 and 32 of lower significance define the rate at which scrolling takes place.

The outputs 13,14 of the AND gates 10 and 11 are connected with the inputs 1A and 1B of the display unit 1. The output terminals 9C to 9H of the analogue to digital convertor unit 9 are connected to corresponding inputs 1C to 1H of the display unit 1.

Figure 2:
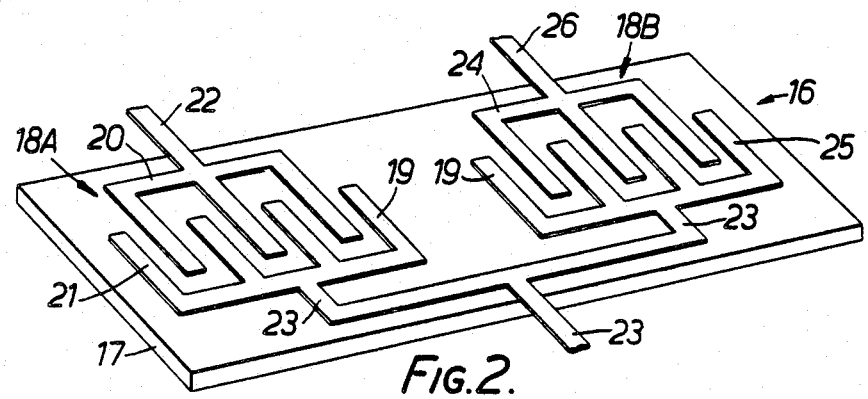
FIG. 2 is a schematic view of a detail of the system.

Referring now to FIG. 2, this Figure schematically illustrates an embodiment of the manual pressure control unit 2 for producing the requisite analogue input signals to the differential amplifier 7.

The unit of FIG. 2 includes a printed circuit board assembly 16 having a substrate 17 of generally elongate rectangular form. The substrate carries two separate groups 18A, 18B of conductive tracks 19. The group 18A of conductive tracks 19 includes two separate sets 20,21 of parallely arranged tracks 19. The tracks of the set 20 are electrically interconnected to a common further track 22 and the tracks of the set 21 are electrically interconnected to a common further track 23.

In the case of the group 18B the arrangement is similar to that of group 18A thus the group includes sets 24,25 of parallely arranged tracks 19. The tracks of the set 24 are electrically interconnected as to a common further track 26, and the tracks of the set 25 are electrically interconnected to the common further track 23.

The track 23 is intended to be connectable to a driving voltage supply (not shown). The tracks 22 and 26 provide the outputs 3 and 4 of the unit 2 to the amplifier 7.

Figure 3:
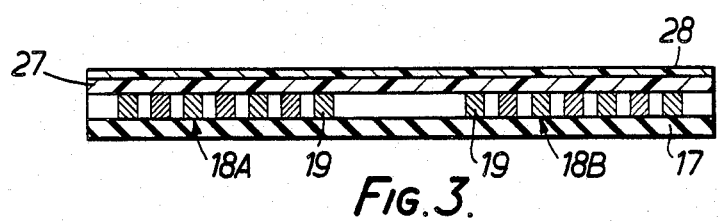
FIG. 3 is a schematic representation of a further detail of the system.

An elastomeric pad 27 (FIG. 3) of plastics material conductivity is positioned over each said conductor group. One such material is sold under the trademark 'prestaduct'. The doping can be by means of particles and granules, of an electically conductive material having a predetermined characteristic resistance.

The elastomeric pads are protected by a sheet 28 of plastics material. Each elastomeric pad 27 has the property of changing its conductivity in response to the application of pressure to the material. Thus in the normal undepressed or ambient condition the material exhibits a first relatively high resistivity so that whilst the pad electrically contacts the two sets of strips of the associated group the electrical conductivity from set to set is at a minimum whereby the output current, delivered across the contact sets being connected by the elastomeric pad 27 is at a minimum.

On exerting manual pressure upon the elastomeric pad 27 there is a progressive change in the electrical conductivity of the pad in response to a pressure change so that the current flow therethrough increases in relation to the pressure applied. In practice, the electrical response to the pressure may be adjusted so that an initial pressure needs to be exerted in order to produce a response. That is to say a 'feel' condition may be built-in to the operation of the transducer arrangement by progressively increasing the amount of pressure that needs to be exerted to produce a correspondingly progressive change in the output current from the transducer switch unit can be obtained.

It will be understood that the response to pressure will be the same for both groups 18A, 18B of conductive tracks 19, and that since the effects upon the groups are essentially independent of each other, the control unit 2 effectively provides two separate control sections.

In practice, the output of one of the sections is associated with displacement of the display in a first direction and output of the other is associated with displacement of the display in the reverse direction. In practice, it is convenient to regard the transducer units as being respectively associated with UP and DOWN movements of the display 1.

The outputs of the two transducer sections are respectively connected to the output lines 3,4 and thus to the inputs of the differential amplifier which later produces an output whose amplitude is related to the sense and magnitude of the output of the control unit section.

I claim:

1. Data display apparatus comprising:
   (a) a display unit having a display area for displaying data,
   (b) a manual control unit comprising first and second pressure transducers for converting manual pressure into first and second electrical signals characteristic of pressure applied to the first and second pressure transducers respectively, and
   (c) means responsive to the first electrical signal for scrolling the data in a first direction relative to the display area at a rate proportional to the first electrical signal and
   (d) means responsive to the second electrical signal for scrolling the data in a second direction, opposite to the first direction, at a rate proportional to the second electrical signal, wherein each of said pressure transducers comprises:
      (i) at least two conductive strips, and
      (ii) an elastomeric element in electrical contact with each of the conductive strips, the elastomeric element having a resistance which varies according to pressure applied to the elastomeric element.

2. Apparatus to claim 1 wherein the elastomeric element comprises a sheet of plastic material containing particles of an electrically conductive material.

3. Apparatus for scrolling lines of data relative to a display area of a data display apparatus, comprising means for producing a selectively controllable scrolling action including a transducer device for converting manual pressure into an electrical analog output characteristic of an applied pressure, and means for converting the analog output into a series of digital signals of which at least one is indicative of a particular direction of scrolling and two or more of the other digital signals in the series are indicative of the rate of scrolling in said particular direction, wherein the transducer device includes at least two conductive strips, and an elastomeric element in electrical contact with each of the strips, said elastomeric element having a resistance which varies according to the extent of distortion or compression of the elastomeric element.

4. Apparatus as claimed in claim 3, wherein the conductive strips comprise two separate groups of conductive tracks, each group comprising two sets of parallelly arranged tracks, with the tracks of one set electrically connected to a common further track and with the tracks of the other set electrically connected to a common additional track and in which electrical signals carried by the common further tracks of each group provides outputs from the transducer device.

* * * * *